UNITED STATES PATENT OFFICE.

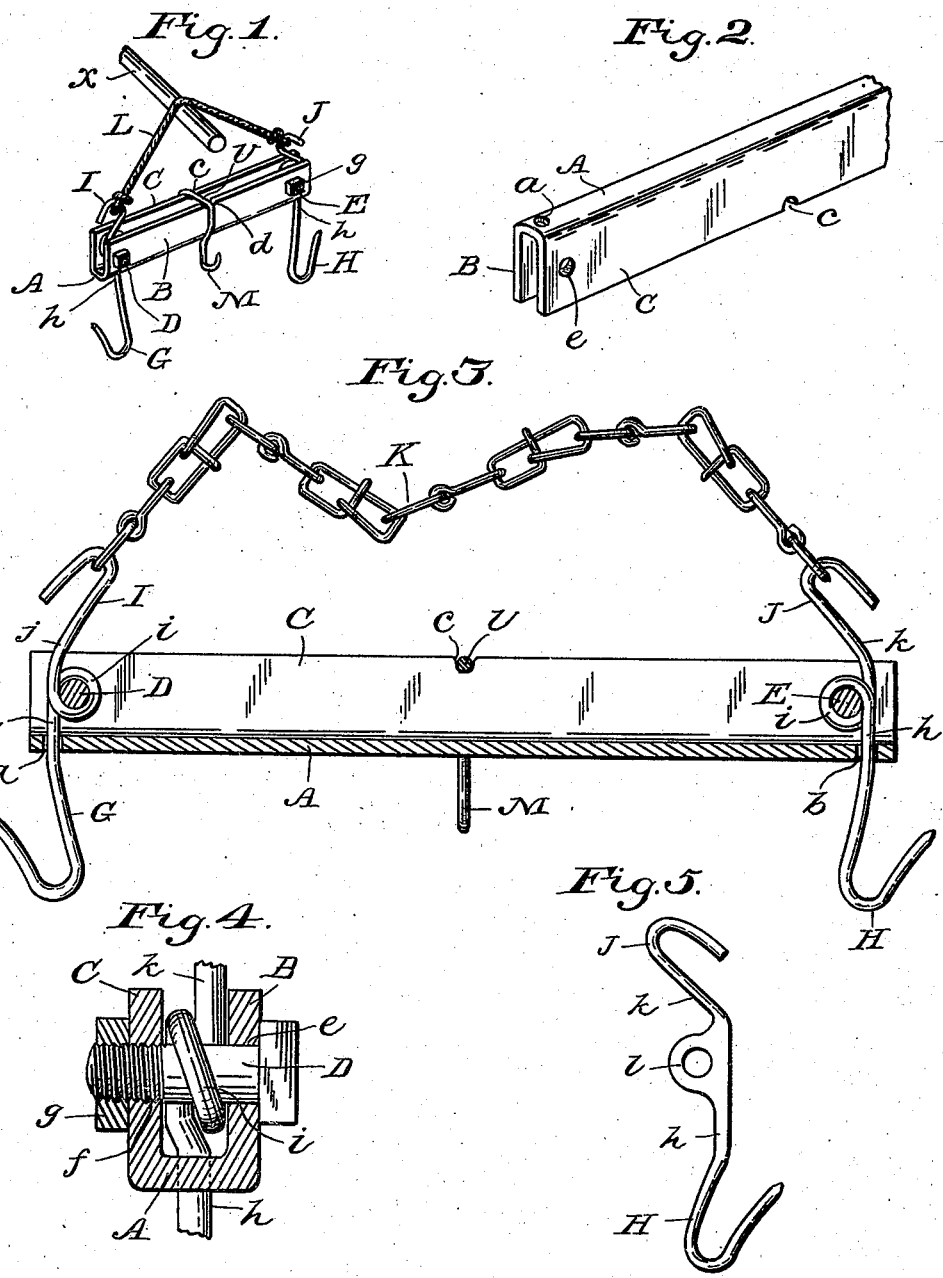

MILTON T. DARNALL, OF GREENCASTLE, INDIANA.

HOG AND MEAT HANGER.

No. 847,738.  Specification of Letters Patent.  Patented March 19, 1907.

Application filed June 27, 1906. Serial No. 323,542.

*To all whom it may concern:*

Be it known that I, MILTON T. DARNALL, a citizen of the United States, residing at Greencastle, in the county of Putnam and State of Indiana, have invented new and useful Improvements in Hog and Meat Hangers; and I do declare the following to be a full, clear, and exact description of the invention, reference being had to the accompanying drawings, and to the letters and figures of reference marked thereon, which form a part of this specification.

The invention relates to devices that are designed to be used in lieu of gambrel-sticks for hanging up carcasses of hogs or other animals to be cleaned and for handling the hogs in the scalding-tank, and the invention has reference particularly to hangers for hogs that are adapted to be used also for hanging hams and other pieces of meat in smoke-houses to be cured.

Objects of the invention are to provide a hanger of the above-mentioned character which shall be of light weight, strong and simple in construction, and relatively cheap and durable in use; to provide a hanger from which the legs of the hogs cannot become accidentally detached when in use, and to provide a hanger that may be adapted to be used for various purposes.

With the above-mentioned and minor objects in view the invention consists in a metallic hanger comprising a hook-sling and a spreader of novel construction and a hook detachably connected to the spreader, the invention consisting, further, in the specific parts and combinations and arrangements of parts, as hereinafter particularly described and claimed.

Referring to the drawings, Figure 1 is a perspective view of a hanger constructed substantially in accordance with the invention and shown suspended on a pole or beam; Fig. 2, a fragmentary perspective view of the spreader inverted; Fig. 3, a side elevation of the sling and central sectional view of the spreader connected thereto; Fig. 4, a transverse sectional view of the spreader at a point of connection of a hook therewith, and Fig. 5 a side view of a modified form of sling-hook.

In construction a spreader is formed, preferably, of sheet metal so as to be light and strong, and it comprises a web part A, to which two side parts B and C are integrally attached, the side parts being considerably broader than the web part so as to serve as supporting-beams. In one end portion of the web part A is a guide-opening $a$, and in the other end portion is a guide-opening $b$, both guide-openings being circular. Notches $c$ and $d$ are formed in the middle portions of the free or top edges of the side parts B and C, and in the end portions of the side parts B and C bolt-holes $e$ and $f$ are formed in pairs, one hole opposite the other, the holes $f$ having screw-threads therein. A bolt D is inserted in one pair of holes and a bolt E is inserted in the other pair of holes, the bolts being screwed into the threaded holes and having each a lock-nut $g$ thereon bearing against the adjacent side part of the spreader. The arrangement of the holes is such as to enable them to hold the bolts at the sides of the axes of the openings $a$ and $b$, the bolts being between the axes of the guide-openings, as preferably constructed. The spreader will be most serviceable if galvanized.

A hook G is inserted through the opening $a$, and a hook H is inserted through the opening $b$, each hook having a shank $h$, at the end of which is an eye $i$, through which a bolt D or E extends, and thereby secures the hook and fastens it to the spreader. The hooks have their main parts or stems inclined each toward the other. A hook I has a shank $j$, that is attached to the eye $i$ of the hook G, and a hook J has a shank $k$, that is attached to the eye $i$ of the hook H, the main parts or stems of the hooks I and J being inclined each toward the other. The hooks G and I are preferably formed integrally with their shanks and eye of a single piece of drawn wire or rolled round bar iron or steel, so as to be light and strong and slightly elastic laterally in order to be able to withstand rough usage. The hooks H and J are also formed in the same manner, but are applied to the spreader in reverse order to the other hooks, as shown. In some cases, however, the double hooks, as H and J, with their shanks $h$ and $k$, and an eye $l$, as in Fig. 5, may be formed of malleable iron or cast-steel as a single piece.

A sling-link comprising a chain K or rope L is detachably connected to the hooks I and J and is adapted to be hung on a pole or beam, as $x$ in Fig. 1, for supporting the hooks and spreader.

For hanging meat in smoke-houses a hook M is provided, which has a finger $v$, that is crooked and adapted to lie in the notches $c$ and $d$ of the spreader and support the hook removably on the spreader, so that the hook may be removed when not needed.

In practical use the hanger may be used in substantially the same manner that gambrels have heretofore been made use of, except that the legs of a hog are to be hung on the hooks G and H, from which they cannot accidentally slip off while being hung up nor after having been suspended. The hanger is to be supported somewhat as shown in Fig. 1. When using the hanger for hanging meat in a smoke-house, both the hooks G and H and also the hook M may be used, thereby making use of the full capacity of the hanger. When shipping the hangers or for storing them, the bolts D and E may be withdrawn. Then the hooks may be placed between the side parts of the spreader compactly, after which the bolts may be replaced, and the chain or rope may be placed also in the spreader or alongside of it, so that the whole will occupy but little space.

Having thus described the invention, what is claimed as new is—

1. A hog and meat hanger comprising a spreader having notches therein and provided with a pair of bolts, each bolt having a pair of integrally-formed hooks provided with an eye connected thereto, the hooks of each pair being at opposite sides of the spreader, and a hook having a crooked finger to be hung in the notches.

2. In a hanger, the combination of a spreader having a web part provided in each end thereof with a guide-opening and two side parts integral with the web part and having bolt-holes in the ends thereof, bolts in the bolt-holes, and a pair of double-end hooks secured to the spreader, one part of each double-end hook extending through a guide-opening, and each double-end hook having an eye common to both hook parts thereof connected to the bolt.

In testimony whereof I affix my signature in presence of two witnesses.

MILTON T. DARNALL.

Witnesses:
  HARVY A. REEVES,
  JOHN H. JAMES.